United States Patent
Un

(10) Patent No.: US 7,373,672 B2
(45) Date of Patent: May 13, 2008

(54) METHOD FOR SECURELY MANAGING INFORMATION IN DATABASE

(75) Inventor: Kang Chun Un, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 989 days.

(21) Appl. No.: 10/074,044

(22) Filed: Feb. 14, 2002

(65) Prior Publication Data

US 2003/0053631 A1 Mar. 20, 2003

(30) Foreign Application Priority Data

Jul. 7, 2001 (KR) .............................. 2001-40684

(51) Int. Cl.
*G06F 11/30* (2006.01)
*G06F 12/14* (2006.01)
*H04L 9/32* (2006.01)

(52) U.S. Cl. .......................... 726/31; 705/50; 713/193

(58) Field of Classification Search ................ 380/277; 713/193; 726/30
See application file for complete search history.

(56) References Cited

U.S. PATENT DOCUMENTS

| | | | | |
|---|---|---|---|---|
| 5,519,435 A | * | 5/1996 | Anderson | ..................... 725/92 |
| 6,088,454 A | * | 7/2000 | Nagashima et al. | ........ 380/286 |
| 6,141,753 A | * | 10/2000 | Zhao et al. | ................. 713/176 |
| 6,484,260 B1 | * | 11/2002 | Scott et al. | .................. 713/186 |
| 6,658,114 B1 | * | 12/2003 | Farn et al. | ................... 380/277 |
| 6,732,277 B1 | * | 5/2004 | Vandergeest et al. | ......... 726/19 |
| 2001/0021251 A1 | * | 9/2001 | Kasai | ......................... 380/201 |

FOREIGN PATENT DOCUMENTS

| EP | 851629 A2 | * | 7/1998 |
|---|---|---|---|
| JP | 2000-311114 | | 11/2000 |

* cited by examiner

Primary Examiner—Gilberto Barron, Jr.
Assistant Examiner—Samson Lemma
(74) Attorney, Agent, or Firm—Sughrue Mion, PLLC

(57) ABSTRACT

A method for storing and securely managing important information for a user in a database includes storing synchronizing information, which changes when a portion of the important information is updated, in the database together with the important information, and encrypting the synchronizing information; distributively storing the encrypted synchronizing information in a plurality of predetermined places; and combining and decrypting the synchronizing information stored in the predetermined places and determining whether the combined synchronizing information is identical to the synchronizing information stored in the database. A content file may include a header portion, including key-data for synchronizing information and synchronizing information distributively stored in a plurality of predetermined places of a hard disc, and a data portion. The header portion may also include key-data for Digital Rights Management (DRM) information and DRM information distributively stored in the plurality of predetermined places of the hard disc.

8 Claims, 4 Drawing Sheets

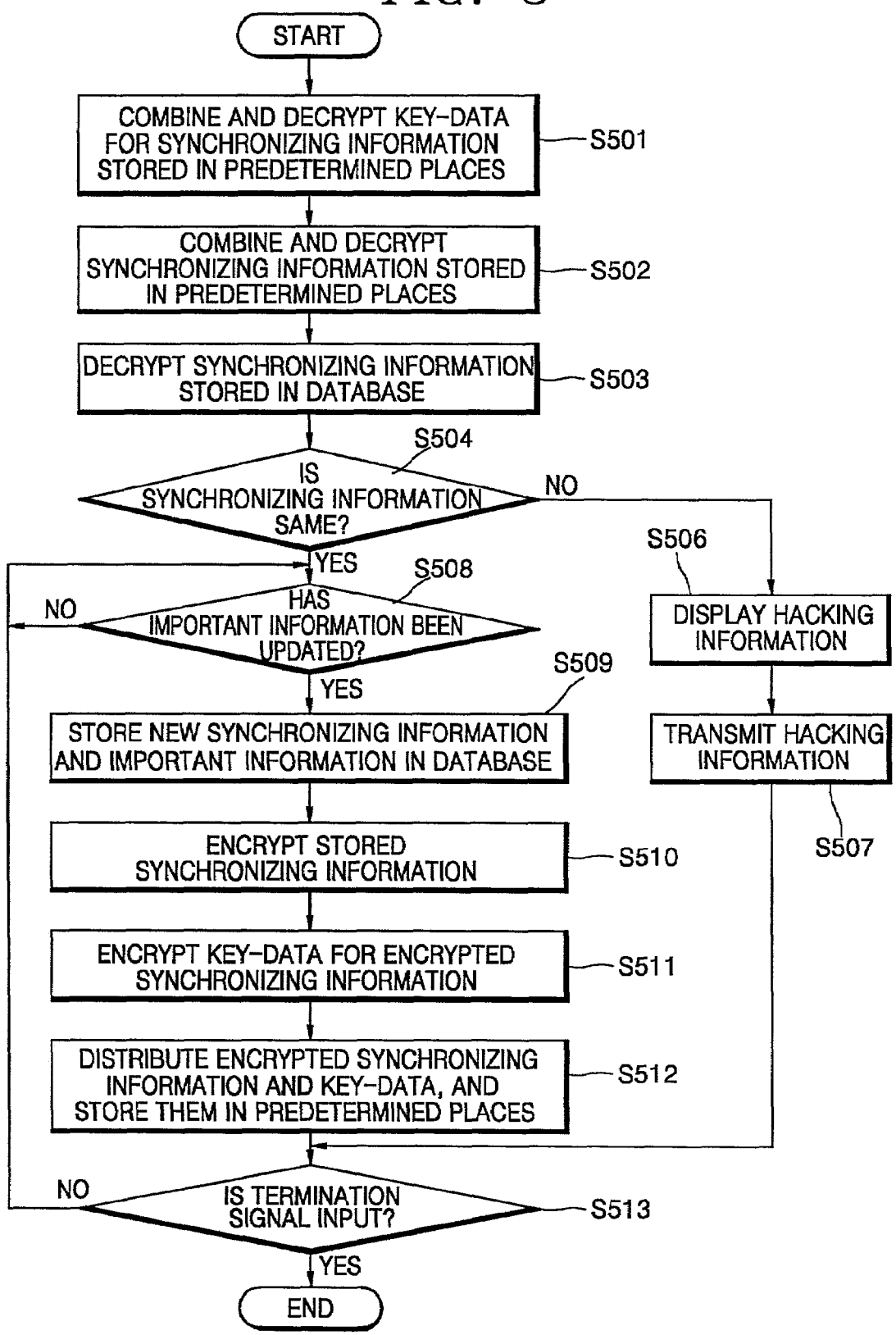

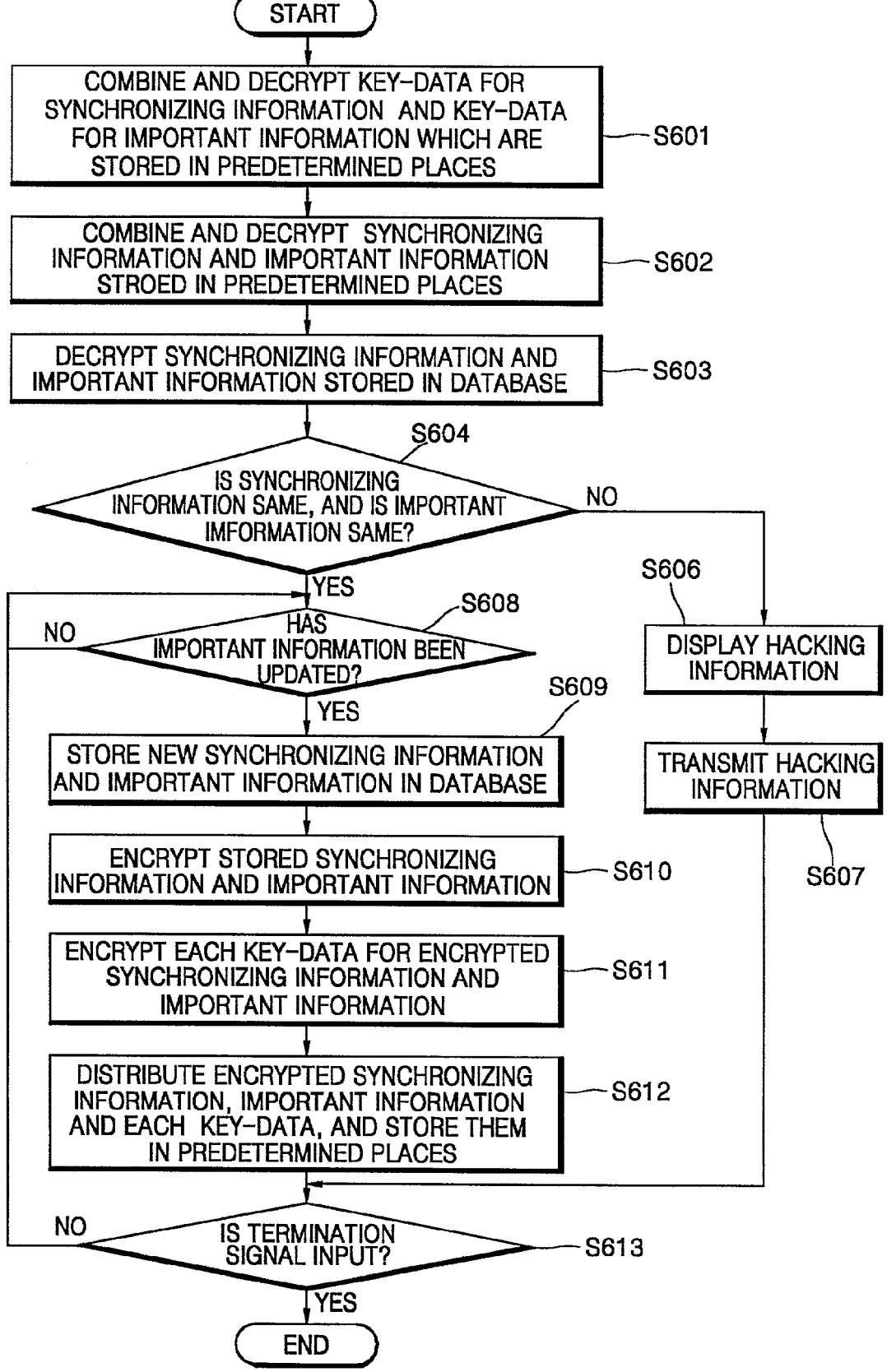

METHOD FOR SECURELY MANAGING INFORMATION IN DATABASE

BACKGROUND OF THE INVENTION

1. Field of the Invention

The present invention relates to a method for securely managing information in a database, and more particularly, to a method for storing and securely managing important information for a user in a database.

2. Description of the Related Art

FIG. 1 is a diagram of a related art communication system, for example, an Internet system, for Digital Rights Management (DRM). User computers 10a ... 10d, a content providing server 141, a key-data management server 142, and a payment system 143 are connected to one another through a communication network 12. The content providing server 141 provides content to the user computers 10a ... 10d and receives charges related to DRM through the payment system 143. The key-data management server 142 manages key-data for encrypting and decrypting content files, which the content providing server 141 provides to the user computers 10a ... 10d.

Referring to FIG. 2, a related art content file includes a header 31 and data 32. The header 31 includes encryption information EI, user key-data KU, and DRM information DRM. The encryption information EI contains parameters used for encrypting the data 32, and the user key-data KU is used for encrypting and decrypting the data 32 of the content file. The DRM information indicates the number of use times permitted to a user.

However, the related art system and method has various problems and disadvantages. For example, but not by way of limitation, according to a simple method of managing information with such a related art file structure, the header 31 can be decrypted by a hacker even if it has been abstrusely encrypted. Accordingly, the hacker can change important information for a user such as DRM information. Therefore, in addition to encryption of information, it is necessary to efficiently determine whether the encrypted information has been accessed and/or altered without authorization (i.e., hacked) to securely manage information in a database.

SUMMARY OF THE INVENTION

To solve at least the above-described problems, it is an object of the present invention to provide a method for securely managing information in a database by encrypting the information and efficiently determining whether the encrypted information has been hacked.

To achieve the above object of the invention, there is provided a method for storing important information for a user in a database and securely managing the stored important information for a user is provided. The method includes an encrypting step, a storing step, and a checking step. In the encrypting step, synchronizing information, which changes whenever at least one piece of the important information for a user is updated, is stored in the database together with the important information for a user and the synchronizing information is encrypted. In the storing step, the encrypted synchronizing information is distributively stored in predetermined places. In the checking step, the synchronizing information stored in the predetermined places is combined and decrypted, and it is checked whether the combined and decrypted synchronizing information is the same as the synchronizing information stored in the database.

According to the present invention, the synchronizing information stored in the predetermined places is combined and decrypted and whether it is the same as the synchronizing information stored in the database is checked, to efficiently determine whether the important information for a user has been hacked. Therefore, the present invention can manage the information in the database more securely than in the related art case of depending solely on encryption. In addition, since the present invention distributively stores the encrypted synchronizing information in predetermined places, the risk of exposing the encrypted synchronizing information is minimized.

Additionally, to achieve at least the aforementioned objects and overcome at least the aforementioned problems and disadvantages of the related art, a method for storing and securely managing important information for a user in a database is provided, comprising (a) storing synchronizing information, which changes when at least one piece of the important information for a user is updated, in the database together with the important information for a user, and encrypting the synchronizing information, and (b) distributively storing the encrypted synchronizing information in a plurality of predetermined places. The method also comprises (c) combining and decrypting the synchronizing information stored in the predetermined places and determining whether the combined and decrypted synchronizing information is identical to the synchronizing information stored in the database.

Further, a content file is provided that comprises a header portion having key-data for synchronizing information and synchronizing information distributively stored in a plurality of predetermined places of a hard disc, and a data portion.

Also, a content file is provided that comprises a header portion having key-data for Digital Rights Management (DRM) information and DRM information distributively stored in a plurality of predetermined places of a hard disc, and a data portion.

BRIEF DESCRIPTION OF THE DRAWINGS

The above object and advantages of the present invention will become more apparent by describing in detail preferred embodiments thereof with reference to the attached drawings in which:

FIG. 5 is a flowchart of a first embodiment of a program performed by a user computer to securely manage DRM information of the content file of FIG. 3; and FIG. 6 is a flowchart of a second embodiment of a program performed by a user computer to securely manage DRM information of the content file of FIG. 3.

DETAILED DESCRIPTION OF THE EXEMPLARY EMBODIMENTS

Figure 3:
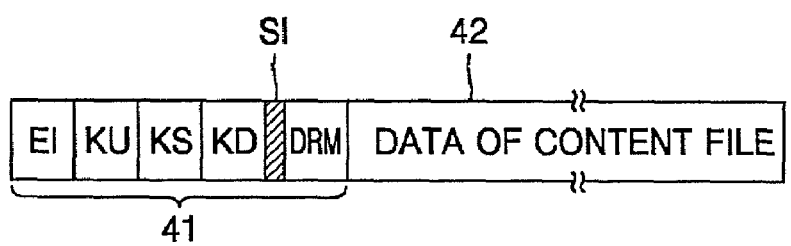
FIG. 3 is a block diagram of the structure of a content file according to an embodiment of the present invention.

FIG. 3 illustrates a content file according to an embodiment of the present invention that includes a header 41 and data 42. The header 41 includes encryption information EI, user key-data KU, key-data KS for synchronizing information, key-data KD for Digital Right Management (DRM) information, synchronizing information SI, and DRM information, which is important information for a user. In the present invention, "important information" is defined to include, but is not limited to, DRM information that indicates a number of use times permitted to a user, so as to enable effective performance of DRM.

In the header 41, the encryption information EI contains parameters used for encrypting the data 42 of the content file, and the user key-data KU is used for encrypting and decrypting the data 42 of the content file. Also, the key-data KS for synchronizing information is used for encrypting and decrypting the synchronizing information SI, and the key-data KD for DRM information is used for encrypting and decrypting the DRM information. The synchronizing information SI is continuously updated to determine whether the important DRM information has been hacked. In an embodiment of the present invention, the synchronizing information SI can be embedded in the DRM information. Important DRM information indicates, for example, the number of use times permitted to a user, but is not limited thereto.

Figure 1:
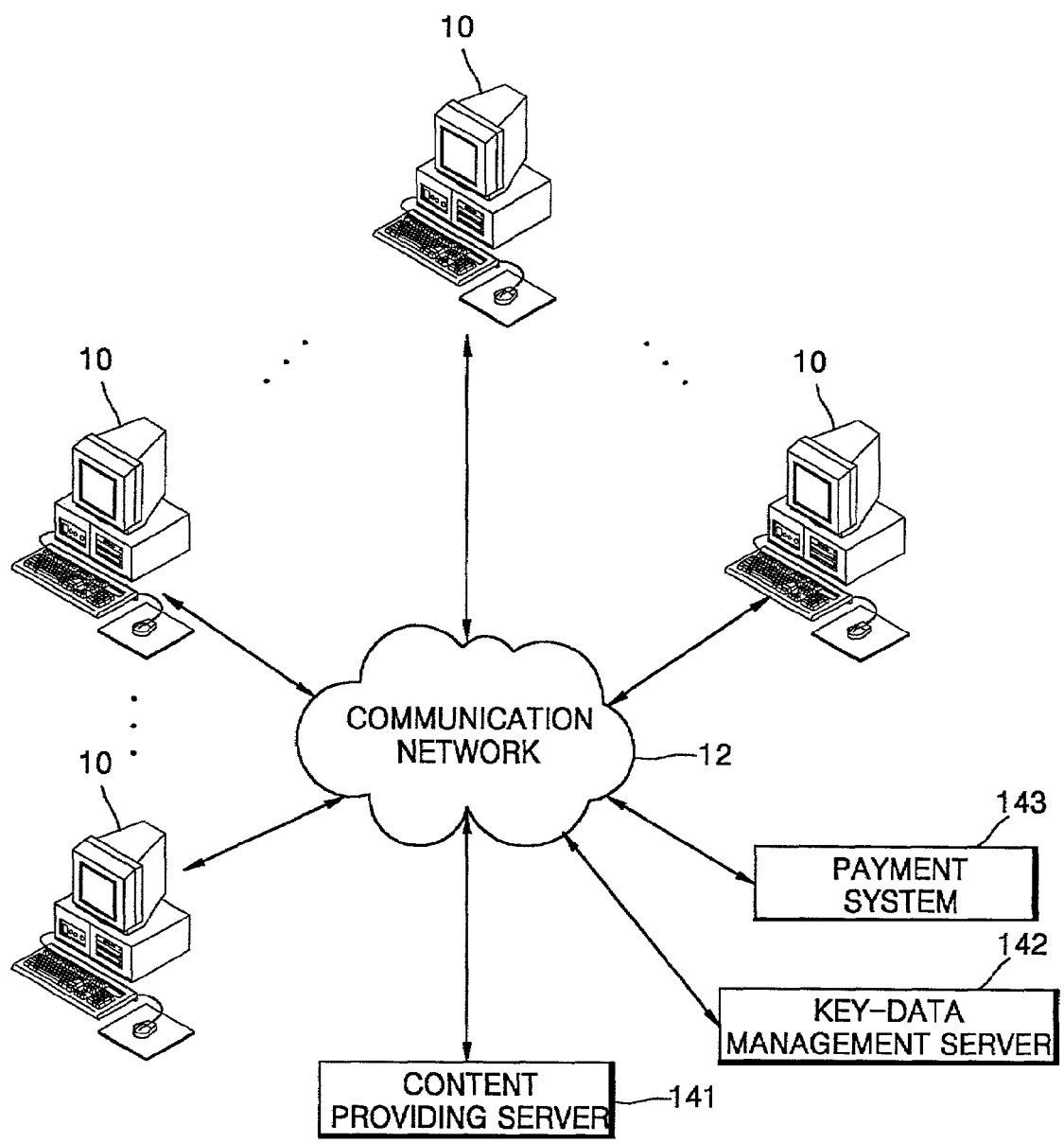
FIG. 1 is a diagram of a related art communication network system for Digital Rights Management (DRM)
Figure 2:
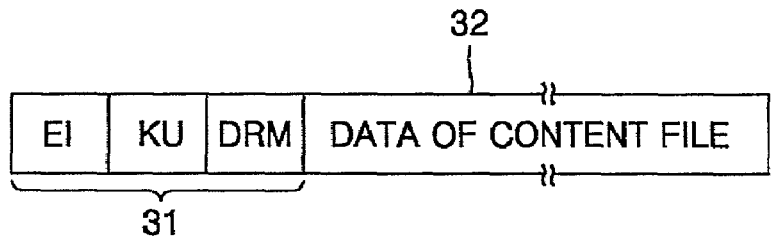
FIG. 2 is a block diagram of the structure of a related art content file.
Figure 4:
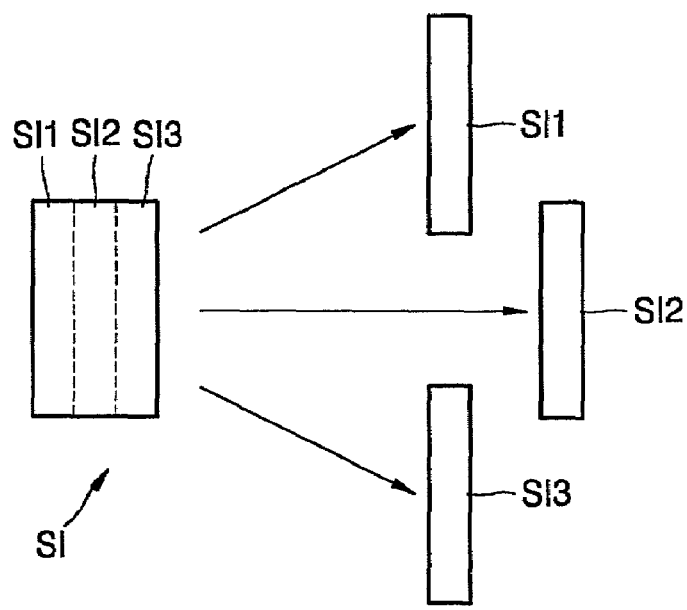
FIG. 4 is a diagram showing a state in which encrypted synchronizing information of the content file of FIG. 3 is distributively stored in predetermined places.

FIG. 4 illustrates the encrypted synchronizing information SI, which is distributively stored in predetermined places S11, S12, and S13, for example. For example, but not by way of limitation, if an information managing method according to the present invention is applied only to the user computer 10a of FIG. 1 (here, the important information will not be the DRM information DRM of FIG. 3), the encrypted synchronizing information SI is distributed and stored in predetermined places of a hard disc drive. In this case, when the information managing method is applied to a communication network system as shown in FIG. 1, the encrypted synchronizing information SI may be distributed and stored in the key-data management server 142. Since the encrypted synchronizing information SI is distributed and stored in predetermined places, the risk of exposing the encrypted synchronizing information SI is minimized. According to this principle, the synchronizing information SI and the key-data KS for synchronizing information of FIG. 3 are distributed and stored in predetermined places according to a method shown in FIG. 5. The important DRM information DRM and the key-data KD for DRM information can be distributed and stored in predetermined places according to a method shown in FIG. 6.

FIG. 5 shows a first embodiment of a program performed by the user computer 10a of FIG. 1 to securely manage the important DRM information DRM of the content file of FIG. 3. In the program of FIG. 5, the important DRM information DRM is not encrypted, so the DRM information key-data KD of FIG. 3 is not necessary.

Key-data for synchronizing information distributively stored in predetermined places is combined and decrypted in step S501. Then, synchronizing information distributively stored in predetermined places is combined and decrypted in step S502. Here, the synchronizing information is decrypted based on the key-data decrypted in step S501.

Next, encrypted synchronizing information SI of FIG. 3 stored in a database, for example, a hard disk within the user computer 10a of FIG. 1, is decrypted in step S503. Next, in step S504, it is determined whether the synchronizing information decrypted in step S502 is the same as the synchronizing information decrypted in step S503. If the synchronizing information decrypted in step S502 is not the same as the synchronizing information decrypted in step S503, it can be concluded that a content file including the DRM information DRM of FIG. 3 has been hacked. Accordingly, hacking information is displayed in step S506 and is transmitted to a server, for example, the content providing server 141 or the key-data management server 142 of FIG. 1, in step S507.

If the synchronizing information decrypted in step S502 is the same as the synchronizing information decrypted in step S503, then update of the important DRM information DRM is monitored in step S508. The update of the DRM information DRM is related to, for example, the number of uses of the data 42 of the content file of FIG. 3.

If the DRM information DRM has been updated, new synchronizing information and important DRM information DRM is stored in the database in step S509. Next, the synchronizing information SI stored in the database is encrypted in step S510. Next, key-data KS for the encrypted synchronizing information SI is encrypted in step S511. Sequentially, the encrypted synchronizing information and key-data are distributed and stored in predetermined places in step S512. Steps S508 through 512 are repeated until a termination signal is input in step S513.

FIG. 6 shows a second embodiment of a program performed by the user computer 10a of FIG. 1 to securely manage the important DRM information DRM of the content file of FIG. 3. In the program of FIG. 6, the important DRM information DRM is encrypted, so the DRM information key-data KD of FIG. 3 is used.

Key-data for synchronizing information and key-data for DRM information defined as important information for a user, which are distributively stored in predetermined places, are combined and decrypted in step S601. Next, synchronizing information and the important DRM information, which are distributively stored in predetermined places, are combined and decrypted in step S602. In step S602, the synchronizing information and the DRM information are decrypted based on the key-data decrypted in step S601. Next, synchronizing information SI and important DRM information DRM of FIG. 3, which is encrypted and stored in a database, for example, a hard disk of the user computer 10a of FIG. 1, is decrypted in step S603.

Sequentially, in step S604 it is determined whether the synchronizing information decrypted in step S602 is the same as the synchronizing information decrypted in step S603 and whether the important DRM information DRM decrypted in step S602 is the same as the important DRM information DRM decrypted in step S603. If the information is not the same in step S604, it can be concluded that a content file including the DRM information DRM has been hacked. Accordingly, hacking information is displayed in step S606 and is transmitted to a server, for example, the content providing server 141 or the key-data management server 142 of FIG. 1 in step S607.

If the information is the same in step S604, update of the important DRM information DRM is monitored in step S608. The update of the DRM information DRM is related to, for example, the number of uses of the data 42 of the content file of FIG. 3. If the DRM information DRM has been updated, new synchronizing information and important DRM information DRM is stored in the database in step S609. Next, the synchronizing information SI and the important DRM information DRM of FIG. 3 stored in the database are encrypted in step S610. Next, key-data KS for the encrypted synchronizing information SI and key-data KD for the important DRM information DRM are encrypted in step S611. Sequentially, the encrypted synchronizing information, important DRM information and key-data are distributed and stored in predetermined places in step S612. Steps S608 through 612 are repeated until a termination signal is input in step S613.

The present invention has various advantages. For example, as described above, according to an information managing method of the present invention, synchronizing information distributively stored in predetermined places is periodically combined and decrypted, and it is determined whether the synchronizing information is the same as synchronizing information stored in a database. Accordingly, it can efficiently be determined whether important information for a user has been hacked, so information in the database can be managed more securely than in the related art case depending solely on encryption. Therefore, the risk of exposing encrypted synchronizing information is minimized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for storing and securely managing important information for a user in a database, comprising:
    storing synchronizing information, which changes when a portion of the important information is updated, in the database together with the important information, and encrypting the synchronizing information;
    distributively storing the encrypted synchronizing information in a plurality of predetermined places; and
    combining and decrypting the synchronizing information stored in the predetermined places and determining whether the combined synchronizing information is identical to the synchronizing information stored in the database,
    wherein said important information comprises digital rights management (DRM) information that indicates a number of use times permitted to a user so as to enable effective performance of DRM, and
    wherein the synchronizing information changes if at least a portion of the important information is updated.

2. The method of claim 1, wherein the encrypting the synchronizing information comprises encrypting key-data used for encrypting and decrypting the synchronizing information.

3. The method of claim 1, wherein the distributively storing the encrypted synchronizing information comprises distributively storing encrypted key-data in said predetermined places.

4. The method of claim 1, wherein the encrypting the synchronizing information comprises encrypting the updated important information.

5. The method of claim 4, wherein the encrypting the synchronizing information comprises encrypting key-data used for encrypting and decrypting the important information.

6. The method of claim 5, wherein the distributively storing the encrypted synchronizing information comprises distributively storing the encrypted key-data in predetermined places.

7. The method of claim 1, wherein the distributively storing the encrypted synchronizing information comprises distributively storing encrypted important information in said plurality of predetermined places.

8. The method of claim 7, wherein the combining, and decrypting the synchronizing information stored in the predetermined places and determining whether the combined synchronizing information is identical to the synchronizing information stored in the database comprises combining and decrypting the important information stored in the predetermined places and determining whether the decrypted important information is substantially identical to the important information stored in the database.

* * * * *